United States Patent
Bertsch et al.

(10) Patent No.: US 7,993,242 B2
(45) Date of Patent: Aug. 9, 2011

(54) MACHINE CONTROL SYSTEM WITH DIRECTIONAL SHIFT MANAGEMENT

(75) Inventors: Robert Paul Bertsch, Edwards, IL (US); Bruce Henry Hein, East Peoria, IL (US); Jeremy Joe Wilson, Peoria, IL (US); Timothy Allen Goldammer, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 522 days.

(21) Appl. No.: 12/081,642

(22) Filed: Apr. 18, 2008

(65) Prior Publication Data

US 2009/0264251 A1    Oct. 22, 2009

(51) Int. Cl.
*B60W 10/04* (2006.01)
(52) U.S. Cl. ........................................ 477/107; 477/110
(58) Field of Classification Search ................ 477/107, 477/110, 121
See application file for complete search history.

(56) References Cited

U.S. PATENT DOCUMENTS

| | | | |
|---|---|---|---|
| 4,245,604 A | 1/1981 | Lahiff | |
| 4,344,399 A | 8/1982 | Matsumura et al. | |
| 4,593,581 A | 6/1986 | Omitsu | |
| 4,769,774 A | 9/1988 | Narita et al. | |
| 5,024,197 A | 6/1991 | Nakamura | |
| 5,199,326 A | 4/1993 | Iwatsuki et al. | |
| 5,235,946 A | 8/1993 | Fodale et al. | |
| 5,528,500 A | 6/1996 | Al-Charif et al. | |
| 5,729,980 A * | 3/1998 | Mackay | 60/602 |
| 5,836,851 A | 11/1998 | Ruman | |
| 5,863,277 A | 1/1999 | Melbourne | |
| 5,951,258 A | 9/1999 | Lueschow et al. | |
| 5,967,756 A | 10/1999 | Devier et al. | |
| 6,086,510 A | 7/2000 | Kadota | |
| 6,549,839 B2 | 4/2003 | Katakura et al. | |
| 6,634,984 B1 | 10/2003 | Doering et al. | |
| 6,810,853 B1 | 11/2004 | Wong et al. | |
| 6,994,654 B2 | 2/2006 | Sakaguchi et al. | |
| 7,104,924 B2 | 9/2006 | Hawkins | |
| 7,115,065 B2 | 10/2006 | Tabata et al. | |
| 7,165,530 B2 | 1/2007 | Jensen et al. | |
| 7,467,614 B2 * | 12/2008 | Stewart et al. | 123/198 F |
| 7,469,761 B2 * | 12/2008 | Kuras et al. | 180/65.245 |
| 7,591,135 B2 * | 9/2009 | Stewart | 60/600 |
| 2001/0041644 A1 | 11/2001 | Yasuoka et al. | |
| 2007/0213176 A1 | 9/2007 | Fujii et al. | |

* cited by examiner

FOREIGN PATENT DOCUMENTS

| | | |
|---|---|---|
| JP | 2007106177 | 4/2007 |
| JP | 2008030533 | 2/2008 |
| JP | 2007/191062 | 1/2011 |

OTHER PUBLICATIONS

Gorman, Corey L., Anderson, Randall T., "System and Method for Integrated Power Control," U.S. Appl. No. 11/998,427, filed Nov. 30, 2007, 33 pages.

*Primary Examiner* — Ha D. Ho
(74) *Attorney, Agent, or Firm* — Finnegan, Henderson, Farabow, Garrett & Dunner LLP

(57) ABSTRACT

A method is provided for operating a power system. The method includes receiving an operator request for a propulsion direction change. The method also includes selecting a power boost map in response to the propulsion direction change request. The power boost map increases the power rating of a power source of the power system. In addition, the method includes directing power into the power source. The method further includes regulating the power system and accelerating a power source speed according to the power boost map when the power is no longer being directed into the power source.

20 Claims, 4 Drawing Sheets

MACHINE CONTROL SYSTEM WITH DIRECTIONAL SHIFT MANAGEMENT

TECHNICAL FIELD

The present disclosure is directed to a machine control system and, more particularly, to a machine control system with directional shift management.

BACKGROUND

During the operation of a machine, it may be desired to change the machine's direction of propulsion (i.e., forward or backward). When such a direction change is requested, a machine control system initially controls a power train to retard motion in the current direction. Typically, the retarding event is initiated by adjusting the transmission (e.g. downshifting) to drive power into the engine, thereby using parasitic losses to slow the machine down. Driving the power into the engine typically causes the engine speed to increase. If the engine is supplied with fuel during the retarding phase, the engine will generate power that can conflict with the power being dissipated. This may reduce the retarding capability of the engine. Therefore, during retarding events, the supply of fuel to the engine is reduced or cut off.

The retarding phase of the propulsion direction change event ends when the machine starts traveling in the opposite direction and the acceleration phase begins. During the acceleration phase, the transmission no longer directs power into the engine, and the parasitic losses cause the engine slow down. In addition, the control system places an acceleration load on the engine, which causes the engine to transfer to the transmission, any power absorbed during the retarding phase. This further contributes to the decrease in engine speed. To counter the decrease in engine speed and generate enough torque to meet the acceleration demand, the control system resumes or increases the supply of fuel to the engine. However, there is a delay between the resumption or increase of fuel and the generation of an adequate amount of torque to meet the acceleration demand. During this delay, the engine speed may continue to decline and may even fall below a minimum desired speed. While operating below the minimum desired speed, the engine's performance may be unsatisfactory.

One method that has been employed to minimize the amount of time an engine operates at speeds below the minimum desired speed during a propulsion direction change event is disclosed in U.S. Pat. No. 4,769,774 (the '774 patent) issued to Narita et al. on Sep. 6, 1988. During a propulsion direction change event, the system disclosed in the '774 patent determines when the engine speed is accelerating and terminates fueling. As the propulsion direction change event is performed, the system continually monitors the vehicular speed and the engine speed. When the vehicle's ground speed approaches zero or the engine speed approaches a speed that may cause the engine to stall, the system resumes fueling and operates the power train. This allows the control system to resume fueling before the vehicle is propelled in the opposite direction.

Although the system disclosed in the '774 patent resumes fueling earlier in the propulsion change event, the performance of the engine may still be unsatisfactory. In particular, while in the propulsion direction change mode, the power train continues to operate according to a map used when the vehicle is not performing a propulsion direction change event. The focus of operation during non propulsion direction change events may be different from the focus of operation during propulsion direction change events. For example, during a non propulsion direction change event, the focus may be on fuel economy, and the vehicle may operate according to a fuel economy map. However, engine power is sacrificed when operating according to a fuel economy map. Such engine power is needed to accelerate the vehicle in the acceleration phase of the propulsion direction change event. By continuing to operate according a previously selected map, the power train may not be able to meet the demands imposed on it, and its performance may be unsatisfactory.

The disclosed system is directed to overcoming one or more of the problems set forth above.

SUMMARY

In one aspect, the present disclosure is directed toward a method for operating a power system. The method includes receiving an operator request for a propulsion direction change. The method also includes selecting a power boost map in response to the propulsion direction change request. The power boost map increases the power rating of a power source of the power system. In addition, the method includes directing power into the power source. The method further includes regulating the power system and accelerating a power source speed according to the power boost map when the power is no longer being directed into the power source.

Consistent with a further aspect of the disclosure, a power system is provided. The power system includes a power source operably coupled to a transmission. The power system also includes at least one operator interface device, each operator interface device being configured to generate an operator request. The power system further includes a controller. The controller is configured to, in response to an operator request for a propulsion direction change, select a power boost map, which increases the power rating of the power source. The controller is also configured to, in response to an operator request for a propulsion direction change, cause the transmission to direct power into the power source. The controller is further configured to, in response to an operator request for a propulsion direction change, regulate the power system and accelerate the power source speed according to the power boost map when the power is no longer being directed into the power source.

DETAILED DESCRIPTION

Figure 1:
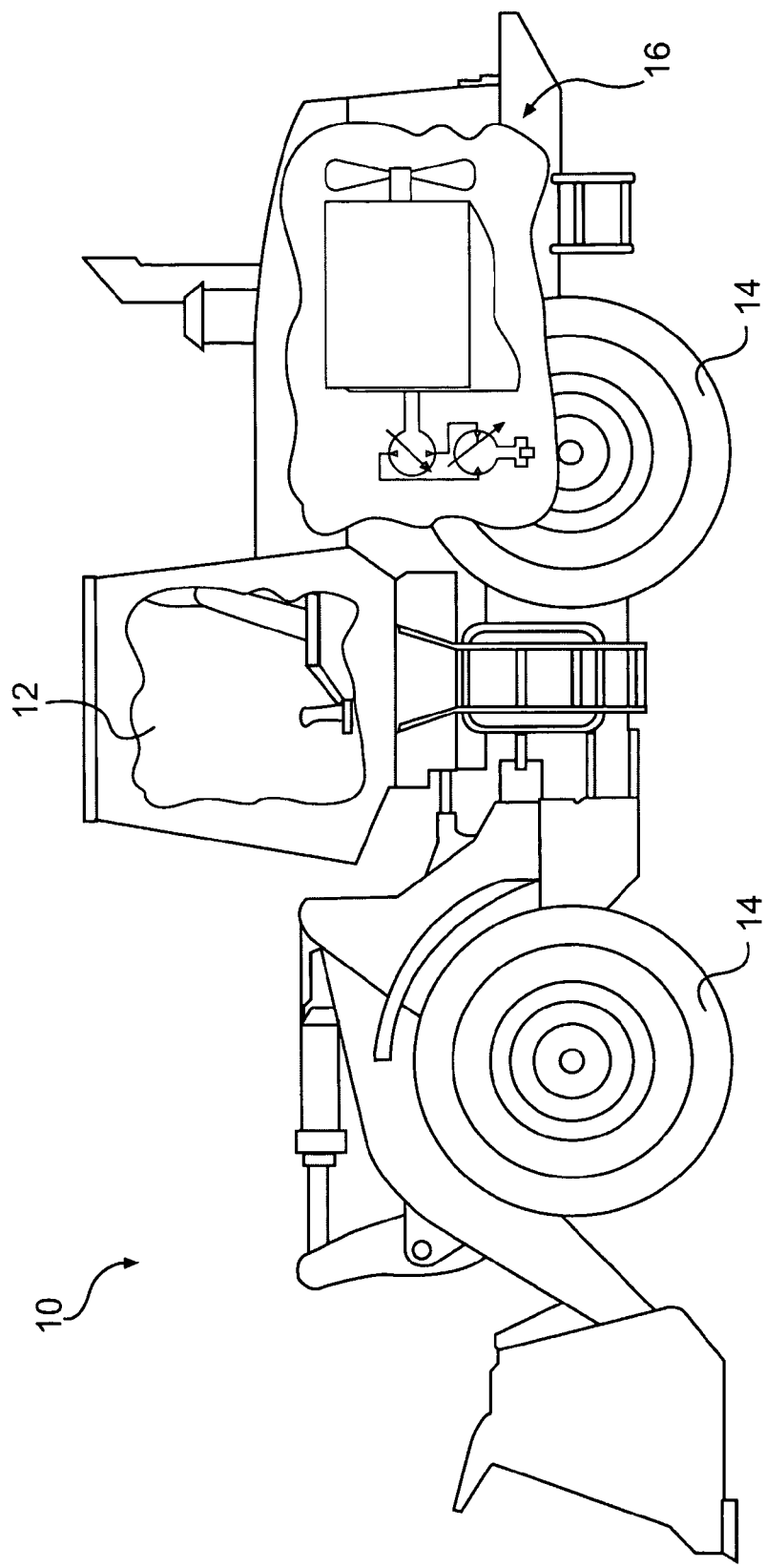
FIG. 1 is an illustration of an exemplary machine.

FIG. 1 illustrates an exemplary machine 10 having multiple systems and components that cooperate to accomplish a task. The tasks performed by machine 10 may be associated with a particular industry such as mining, construction, farming, transportation, power generation, or any other industry known in the art. For example, machine 10 may embody a mobile machine such as the wheel loader depicted in FIG. 1, a bus, a highway haul truck, or any other type of mobile machine known in the art. Machine 10 may include an operator station 12, one or more traction devices 14, and a power system 16 for driving at least one of traction devices 14.

Figure 2:
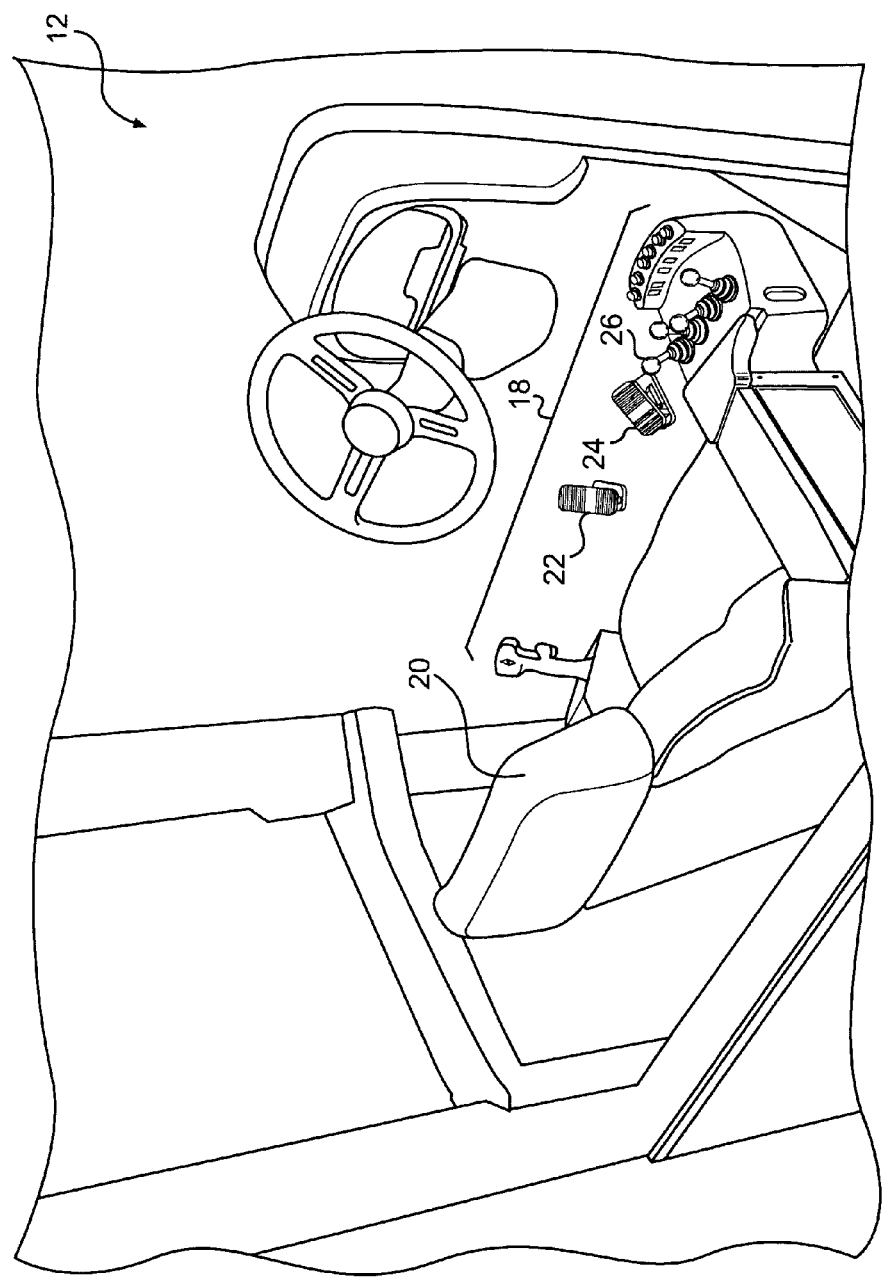
FIG. 2 is a pictorial illustration of an exemplary disclosed operator station for use with the machine of FIG. 1.

As illustrated in FIG. 2, operator station 12 may include devices that receive input from a machine operator indicative of a desired machine travel maneuver. Specifically, operator station 12 may include one or more operator interface devices 18 located proximate an operator seat 20. Operator interface devices 18 may initiate movement of machine 10 by producing displacement signals that are indicative of a desired machine maneuver. In one embodiment, operator interface devices 18 may include a left foot pedal 22, a right foot pedal 24, and a forward-neutral-reverse (FNR) selector 26. As an operator manipulates left foot pedal 22 and/or right foot pedal 24 (i.e., displaces left and/or right foot pedals 22 and 24 away from a neutral position), the operator may expect and affect a corresponding machine travel movement. In addition, as the operator moves FNR selector 26 to a forward, reverse, or neutral position, the operator may affect a corresponding transmission operating mode such as, for example, forward, reverse, or idle. It is contemplated that operator interface devices other than foot pedals such as, for example, joysticks, levers, switches, knobs, wheels, and other devices known in the art, may additionally or alternatively be provided within operator station 12 for travel control of machine 10, if desired. Furthermore, FNR selector 26 may be omitted and other operator input devices may affect the transmission operating mode.

Traction devices 14 (referring to FIG. 1) may embody wheels located on each side of machine 10 (only one side shown). Alternatively, traction devices 14 may include tracks, belts or other known traction devices. It is contemplated that any combination of the wheels on machine 10 may be driven and/or steered.

Figure 3:
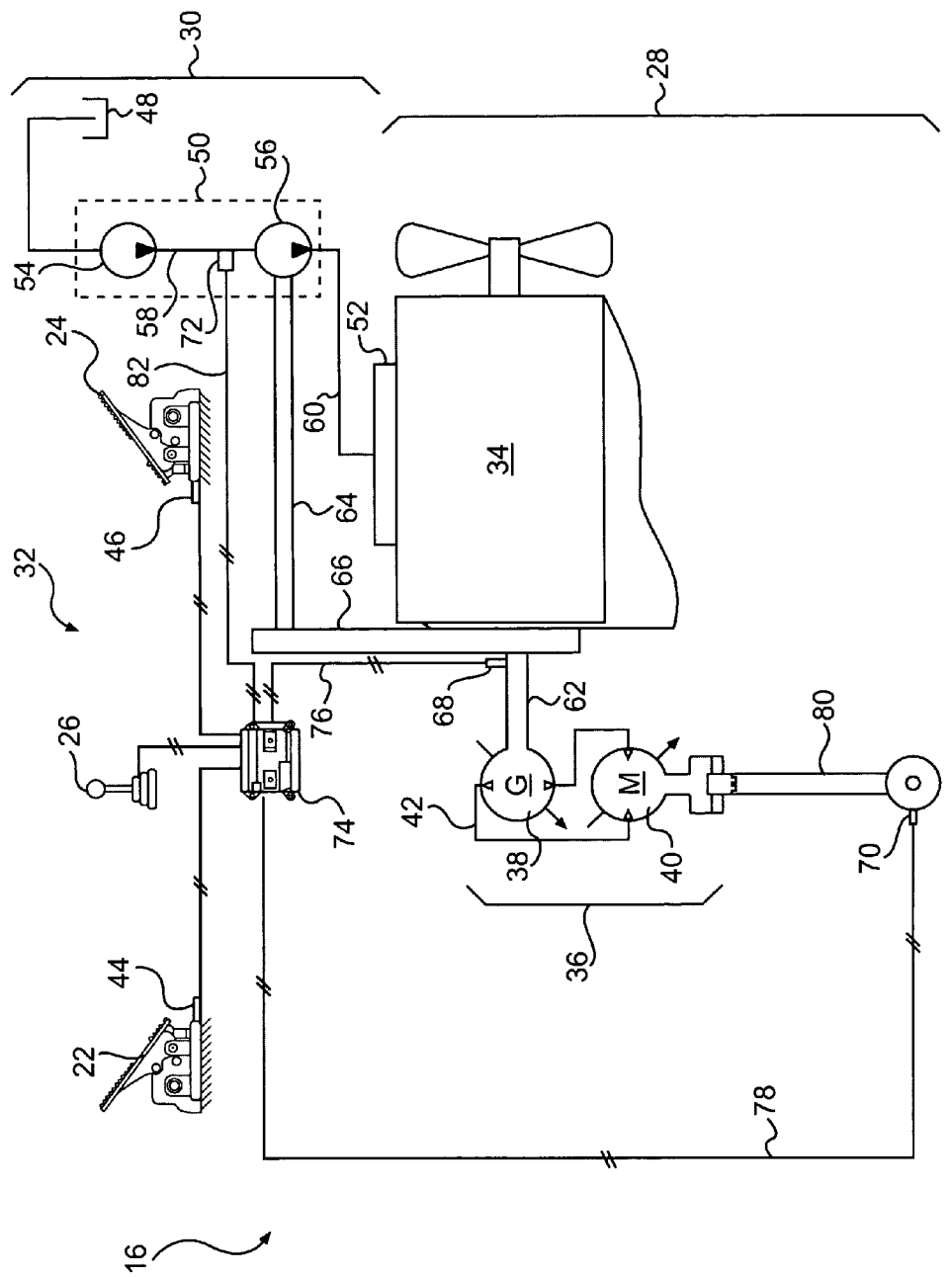
FIG. 3 is a diagrammatic illustration of an exemplary disclosed power system of the machine of FIG. 1.

As illustrated in FIG. 3, power system 16 may drive traction devices 14 (referring to FIG. 1) in response to various operator and environmental inputs. Power system 16 may include a power train 28, a fuel system 30, and a control system 32 for regulating the operation of power system 16 in response to one or more inputs.

Power train 28 may be an integral package configured to generate and transmit power to traction devices 14. In particular, power train 28 may include a power source 34 operable to generate a power output and a transmission 36 connected to transmit the power output in a useful manner to traction devices 14 (referring to FIG. 1)

Power source 34 may include an internal combustion engine having multiple subsystems that cooperate to produce mechanical or electrical power output. For the purposes of this disclosure, power source 34 is depicted and described as a four-stroke diesel engine. One skilled in the art will recognize, however, that power source 34 may be any other type of internal combustion engine such as, for example, a gasoline or a gaseous fuel-powered engine. The subsystems included within power source 34 may include, for example, an air induction system, an exhaust system, a lubrication system, a cooling system, or any other appropriate system.

Transmission 36 may embody, for example, a continuously variable transmission (CVT). Transmission 36 may be any type of continuously variable transmission such as, for example, a hydraulic CVT, a hydro-mechanical CVT, an electric CVT, or other configuration as would be apparent to one skilled in the art. In addition, transmission 36 may include a driving element 38 and a driven element 40.

In the exemplary electric CVT of FIG. 3, driving element 38 may be a generator, such as an alternating field-type generator, and driven element 40 may be an electric motor, such as an alternating field-type motor configured to receive power from driving element 38. The generator of driving element 38 may be connected to drive the motor of driven element 40 with electric current via power electronics 42 in response to a torque command directed to driven element 40. In some situations, the motor of driven element 40 may alternatively drive the generator of driving element 38 via power electronics 42. It is contemplated that, in embodiments utilizing a hydraulic continuously variable transmission, driving element 38 may be a pump, such as a variable displacement pump, and driven element 40 may be a motor, such as a variable displacement motor. Driven element 40 may be fluidly connected to driving element 38 by conduits that supply and return fluid to and from driving element 38 and driven element 40, allowing driving element 38 to effectively drive driven element 40 by fluid pressure.

Power electronics 42 may include generator associated components and motor associated components. For example, power electronics 42 may include one or more drive inverters (not shown) configured to invert three-phase alternating power to direct phase power and vice versa. The drive inverters may have various electrical elements including insulated gate bipolar transistors (IGBTs), microprocessors, capacitors, memory storage devices, and any other similar elements used for operating driving element 38 and driven element 40. Other components that may be associated with the drive inverter include power supply circuitry, signal conditioning circuitry, and solenoid driver circuitry, among others. In addition, power electronics 42 may include a generator heat sink (not shown), and a motor heat sink (not shown) in communication with driving element 38 and driven element 40, respectively. Each heat sink may absorb heat from their respective components of power electronics 42 and transfer this heat to a cooling system (not shown).

Transmission 36 may be at least partially controlled with left and right foot pedals 22 and 24. That is, as left and right foot pedals 22 and 24 are manipulated by an operator, the foot pedals may provide electric signals signifying a desired driven element output such as, for example, a desired torque output and/or a desired speed limit. For example, left and right foot pedals 22 and 24 may have a minimum position and be movable through a range of positions to a maximum position. Sensors 44 and 46 may be provided in association with each of left and right foot pedals 22 and 24, respectively, to sense the displacement positions thereof and produce corresponding signals responsive to the displaced positions. Sensors 44 and 46 may be any sensor capable of sensing the displacement of foot pedals 22 and 24 such as, for example, a switch or potentiometer. The displacement signals from each of sensors 44 and 46 may be directed through control system 32 to transmission 36 to control the torque output of driven element 40.

Fuel system 30 may include components that cooperate to deliver injections of pressurized fuel into each combustion chamber (not shown) of power source 34. Specifically, fuel system 30 may include a tank 48 configured to hold a supply of fuel and a fuel pumping arrangement 50 configured to pressurize the fuel and direct the pressurized fuel to a plurality of fuel injectors (not shown) by way of a common rail 52.

Fuel pumping arrangement 50 may include one or more pumping devices that function to increase the pressure of the fuel and direct one or more pressurized streams of fuel to common rail 52. In one example, fuel pumping arrangement 50 may include a low pressure source 54 and a high pressure source 56 disposed in series and fluidly connected by way of a fuel line 58. Low pressure source 54 may be a transfer pump configured to provide low pressure feed to high pressure source 56. High pressure source 56 may be configured to receive the low pressure feed and to increase the pressure of the fuel. High pressure source 56 may be connected to common rail 52 by way of a fuel line 60. A check valve (not shown) may be disposed within fuel line 60 to provide for unidirectional flow of fuel from fuel pumping arrangement 50 to common rail 52.

One or both of low and high pressure sources 54, 56 may be operably connected to power source 34 and driven by a crankshaft 62 associated with power source 34. Low and/or high pressure sources 54, 56 may be connected with crankshaft 62 in any manner readily apparent to one skilled in the art where a rotation of crankshaft 62 may result in a corresponding rotation of a pump drive shaft. For example, a pump driveshaft 64 of high pressure source 56 may be connected to crankshaft 62 through a gear train 66. It is contemplated; however, that one or both of low and high pressure sources 54, 56 may alternatively be driven electrically, hydraulically, pneumatically, or in any other appropriate manner.

Control system 32 may regulate the operation of power system 16 and may include sensors 68, 70, and 72 for sensing various parameters indicative of engine speed, transmission output, and fueling rate, respectively. Control system may also include a controller 74 for regulating the operation of power system 16 in response to operator requests, environmental inputs, and signals received from sensors 68, 70, and 72. It is contemplated that control system 32 may include additional sensors for sensing other parameters that may be useful for operation of power system 16.

Sensor 68 may be associated with power source 34 to sense an output speed thereof and may be in communication with controller 74 via a communication line 76. In one example, sensor 68 may embody a magnetic pickup type of sensor associated with a magnet embedded within a rotational component of power train 28 such as crankshaft 62 or a flywheel. During operation of power source 34, sensor 68 may sense the rotating magnetic field produced by the magnet and generate a signal corresponding to the rotational speed of power source 34.

Sensor 70 may be associated with transmission 36 and/or traction device 14 (referring to FIG. 1) to sense an output of transmission 36 and/or a travel speed of machine 10 and may be in communication with controller 74 via a communication line 78. In one example, sensor 70 may embody a magnetic pickup type of sensor associated with a magnet embedded within a rotational component of power train 28 such as a transmission output shaft 80. During operation of machine 10, sensor 70 may sense the rotating magnetic field produced by the magnet and generate a signal corresponding to the rotational speed of transmission 36 and/or the corresponding travel speed of machine 10.

Sensor 72 may be associated with fuel system 30 to sense a flow rate of fuel being supplied to power source 34 and may be in communication with controller 74 via a communication line 82. In one embodiment, sensor 72 may be a fuel flow sensor located in or near fuel system 30 to monitor a flow rate of fuel being sprayed into the combustion chambers (not shown) of power source 34. It is contemplated that sensor 72 may be any other type of sensor capable of sensing a parameter indicative of a rate of fuel entering power source 34.

Controller 74 may regulate the operation of power system 16 in response to operator requests, environmental inputs, and signals received from sensors 68, 70, and 72. The operator requests may include magnitude of propulsion, direction of propulsion (i.e., forward or reverse), vehicular speed, output torque, or any other request that may affect the operation of power train 28. A plurality of maps, algorithms, charts, graphs, etc. may be stored in the memory of controller 74 for interpreting various signals indicative of the operator's request. Such signals may be received from FNR selector 26, sensors 44, 46, and/or any other operator interface device 18.

Upon determining the operator request, controller 74 may receive additional input from sensors 68, 70, and 72 and/or may receive environmental data to determine a course of action for operating power system 16.

An exemplary operator request may be a propulsion direction change of machine 10. The operator may initiate such a request by actuating various operator interface devices 18. Controller 74 may receive signals from the actuated interface devices 18 and compare the signals to the above disclosed maps, algorithms, charts, and graphs. The comparison may cause controller 74 to determine that the operator may be requesting a propulsion direction change. Upon such a determination, controller 74 may switch from a current operating mode to a propulsion direction change mode.

While operating in the propulsion direction change mode, controller 74 may cause transmission 36 to direct power to power source 34. Such power may be dissipated through rotational movement of a crankshaft (not shown) of power source 34. Thus, as power may be dissipated through power source 34, the power source speed may increase. If power source 34 were to be supplied with fuel during the retarding phase of the propulsion direction change event, power source 34 may be caused to generate power, which may further increase the rotational speed of the crankshaft. This may increase the power source speed to levels that may be harmful to power source 34. In addition, the generated power may conflict with the power being dissipated to retard the current propulsion of machine 10, thereby reducing the retarding capability of power source 34. Thus, it may be desired to reduce or cut off the supply of fuel to power source 34 during the retarding phase of the propulsion direction change event.

In addition to retarding forward propulsion, controller 74 may follow a power boost map, which may cause power source 34 to operate at a higher power rating. For example, when operating according to the power boost map, a particular manipulation of an operator interface device 18 (e.g., depressing left or right foot pedals 22, 24) may result in a greater torque output than would otherwise occur while operating according to a normal power map.

Transmission 36 may continue dissipating power through power source 34 until machine 10 may reach a ground speed of approximately zero and the retarding phase of the propulsion change event may end. Once machine 10 reaches a ground speed of approximately zero, the power boost map may cause fueling to resume, and machine 10 may be propelled in the opposite direction. It should be understood that the power boost map may cause fueling to resume or increase at a rate greater than would otherwise occur under the normal power map. Such an increase in fueling may continue until a desired speed is achieved.

Controller 74 may embody a single microprocessor or multiple microprocessors for controlling the operation of power system 16 in response to various received signals. Numerous commercially available microprocessors can be configured to perform the functions of controller 74. It should be appreciated that controller 74 could readily embody a general machine microprocessor capable of controlling numerous machine functions. Controller 74 may include a memory, a secondary storage device, a processor, and any other components for running an application. Various other circuits may be associated with controller 74 such as power supply circuitry, signal conditioning circuitry, solenoid driver circuitry, and other types of circuitry.

Figure 4:
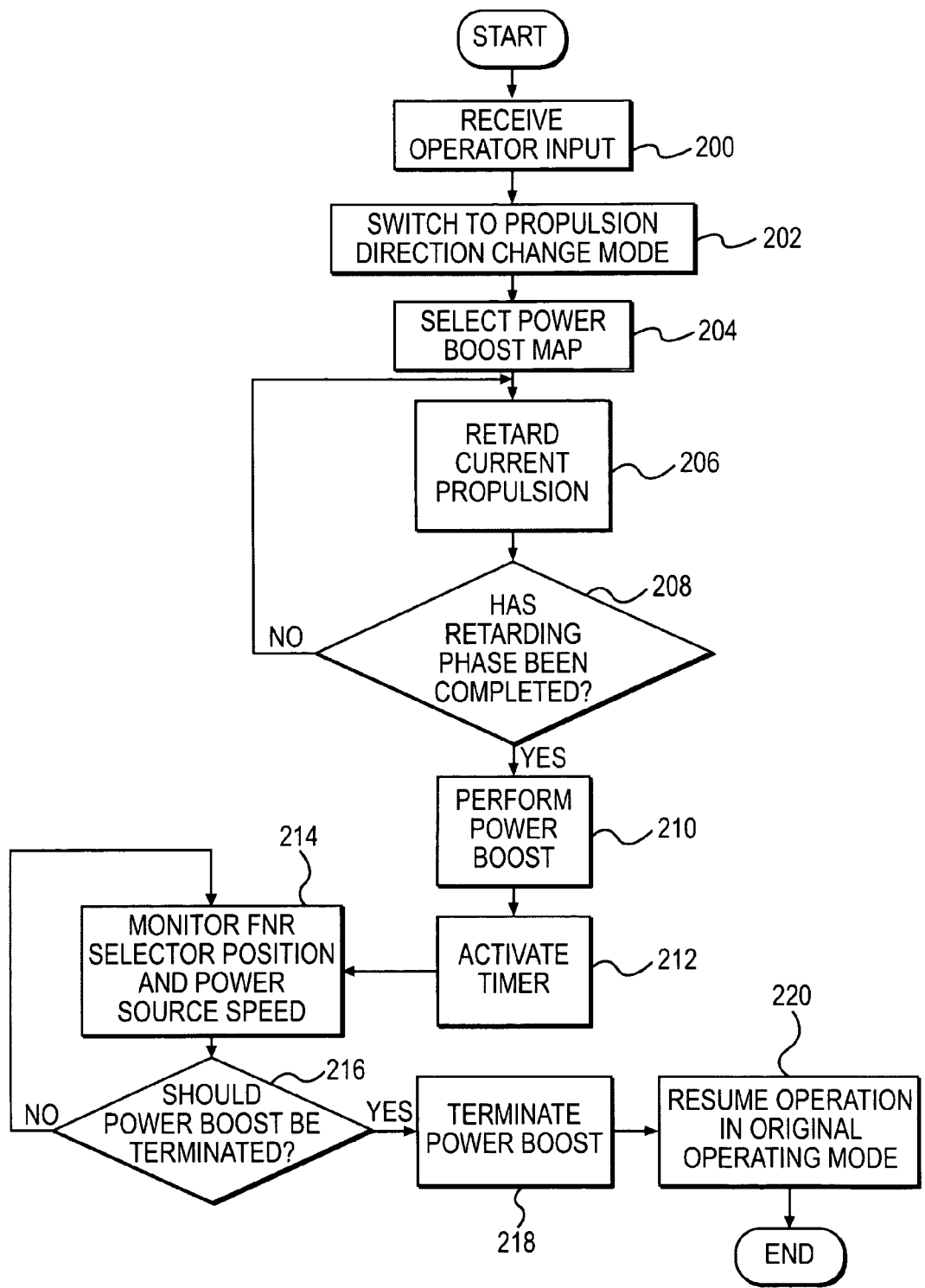
FIG. 4 is a flow diagram illustrating an exemplary method for operating the power system of FIG. 3.

FIG. 4 illustrates an exemplary method of controlling power system 16. In particular, FIG. 4 is a flow chart representing an exemplary method for engaging and operating in the propulsion direction change mode. FIG. 4 will be discussed further in the following section to better illustrate the disclosed system and its operation.

INDUSTRIAL APPLICABILITY

The disclosed power system may be able to improve the performance of the power source during a propulsion direction change event. In particular, the disclosed system may follow a power boost map during such a propulsion direction change event. Operating according to the power boost map may increase the power rating of the power source, thereby improving the performance of the power source and reducing the length of time needed to perform the change of direction event. The method for changing a direction of propulsion will be described below.

As illustrated in FIG. 4, the method may begin when controller 74 receives input from the operator indicative of a desire to change the direction of propulsion (step 200). For example, if machine 10 is being propelled in a forward direction, the operator may desire to change the propulsion direction and begin propelling machine 10 in a reverse direction. Such signals may be generated when the operator manipulates one or more operator interface devices 18. For example, the operator may cause signals to be generated by manipulating left pedal 22, right pedal 24, and/or FNR selector 26.

Upon receiving the signal indicative of changing the direction of propulsion, controller 74 may switch from a current operating mode to a propulsion direction change mode (step 202). While operating in the propulsion direction change mode, controller 74 may select a power boost map to follow when regulating the operation of transmission 36 and the fueling of power source 34 (step 204). The power boost map may increase the power rating of power source 34. For example, when transmission 36 and the fueling of power source 34 are being regulated according to the power boost map, a particular manipulation of an operator interface device 18 (e.g., depressing left or right foot pedals 22, 24) may result in a greater torque output than would otherwise occur while regulating transmission 36 and the fueling of power source 34 according to a normal power map, which may be utilized when controller 74 is not in the propulsion direction change mode.

After switching to the propulsion direction change mode, controller 74 may cause transmission 36 to retard propulsion in the current direction machine 10 may be traveling (step 206). This may be performed by directing power to power source 34, thereby using parasitic losses to retard the propulsion. It should be understood that continuing to fuel power source 34 may cause power source 34 to generate power. This generated power may conflict with the power being driven into power source 34, thereby offsetting or reducing the parasitic losses being used to retard the current propulsion of machine 10. Therefore, controller 74 may reduce or terminate the fueling of power source 34 during the retarding phase of the propulsion direction change event.

As disclosed above, resuming fueling in the retarding phase of the propulsion direction change event may adversely affect the retarding of machine 10. Therefore, it may be desired to determine whether the retarding phase has been completed (step 208). This determination may be made using any number of methods. For example, controller 74 may monitor the ground speed of machine 10. When the ground speed reaches approximately zero, retarding of the forward propulsion may be complete. Controller 74 may monitor the current ground speed via signals received from sensor 70 indicative of the current ground speed of machine 10. If controller 74 determines that the ground speed of machine 10 has not reached a zero ground speed (step 208: No), controller 74 may repeat step 206 (i.e., continue retarding propulsion in the current direction machine 10 may be traveling).

If controller 74 determines that the ground speed of machine 10 has reached approximately zero (step 208: Yes), controller 74 may perform a power boost event according to input from operator interface devices 18 (step 210). For example, the power boost event may be performed according to input from left and right pedals 22, 24. When performing a power boost event, the torque output of power source 34 may be increased according to the power boost map. It should be understood that during a power boost event, the torque output of power source 34 may be greater and/or increase at a greater rate for a given operator input than would otherwise occur during a non-power boost event. This is because, during a power boost event, controller 74 may follow the power boost map, which may increase the power rating of power source 34. In contrast, non-power boost events may follow a normal power map, which may maintain a normal power rating for power source 34.

It is possible that during a propulsion direction change event, communication between controller 74 and FNR selector 26 may be interrupted or lost. If communication is interrupted or lost, controller 74 may not be able to determine whether the operator desires to continue or cancel the propulsion direction change event. This may be especially problematic when controller 74 may be performing a power boost event. If controller 74 continues the power boost event when the operator no longer desires to perform the propulsion direction change event, more fuel may be consumed than desired. However, if controller 74 terminates the power boost event prematurely, power system 16 may perform inadequately. One way to address this dilemma may be to continue performing the power boost event for a predetermined amount of time in the event of an interruption or loss of communication between controller 74 and FNR selector 26. Therefore, as controller 74 may begin the power boost event, a timer may be actuated (step 212). It is contemplated that the timer may be set to any length of time that may permit machine 10 to complete the direction change event such as, for example, five seconds.

After actuating the timer, controller 74 may receive data from FNR selector 26 and sensor 68 to monitor the position of FNR selector 26 and the acceleration of power source 34 (step 214). Based on the received data, controller 74 may determine whether or not to terminate the power boost event (step 216). Controller 74 may terminate the power boost event if any one of three conditions may occur. The first condition may be when the timer expires. The second condition may be when the acceleration of machine 10 or an element of machine 10 may drop below a predetermined threshold where fuel consumption may become more important than power output. Such a threshold may be, for example, when the acceleration of traction devices 14 may drop below 12.5 rev/sec$^2$. The third condition may be when the position of FNR selector 26 is changed, thereby signifying the operator's desire to terminate the propulsion direction change event. If none of these conditions are met, controller 74 may determine that the power boost event should continue (step 216: No), and step 214 may be repeated (i.e., controller 74 may continue receiving data from FNR selector 26 and sensor 68 to monitor the position of FNR selector 26 and the acceleration of power source 34).

If any of the above-mentioned conditions are met, controller 74 may determine that the power boost event should be terminated (step 216: Yes), and controller 74 may terminate the power boost event (step 218). Upon terminating the power boost event, controller 74 may resume operation in the original operating mode in which controller 74 was operating before switching to the propulsion direction change mode (step 220). Once resuming operation in the original operating mode, the method may be terminated.

Selecting a power boost map in response to operating in a propulsion direction change mode may improve the likelihood that the power system performance during the propulsion direction change event is improved. In particular, such a selection may prevent the system from following a map that may be less ideal for operations during the propulsion direction change event. In addition, the power boost may reduce or eliminate the amount of time the engine may operate at a speed less than the minimum desired speed.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A method for operating a power system, comprising:
   receiving an operator request for a propulsion direction change;
   in response to the propulsion direction change request, selecting a power boost map, which increases a power rating of a power source of the power system
   directing power into the power source; and
   regulating the power system and accelerating a power source speed according to the power boost map when power is no longer being directed into the power source.

2. The method of claim 1, further including continuing the acceleration of the power source speed when operator signals relating to the propulsion direction change are not received.

3. The method of claim 2, further including continuing the acceleration of the power source speed for a predetermined period of time when the operator signals relating to the propulsion direction change are not received.

4. The method of claim 3, further including ceasing to accelerate the power source speed according to the power boost map when the predetermined period of time expires.

5. The method of claim 1, further including ceasing to accelerate the power source speed according to the power boost map when an acceleration of a machine powered by the power system falls below a threshold.

6. The method of claim 5, further including ceasing to accelerate the power source speed according to the power boost map when an acceleration of a traction device driven by the power system falls below a threshold.

7. The method of claim 1, further including ceasing to accelerate the power source speed according to the power boost map upon receiving an operator request to terminate the propulsion direction change.

8. A power system, comprising:
   a power source operably coupled to a transmission;
   at least one operator interface device, each operator interface device being configured to generate an operator request; and
   a controller configured to, in response to an operator request for a propulsion direction change:
   select a power boost map, which increases a power rating of a power source of the power system
   cause the transmission to direct power into the power source; and
   regulate the power system and accelerate a power source speed according to the power boost map when power is no longer being directed into the power source.

9. The power system of claim 8, wherein the controller is further configured to continue the acceleration of the power source speed when communication between the controller and the at least one operator interface device is interrupted or lost.

10. The power system of claim 9, wherein the controller is further configured to continue accelerating the power source speed for a predetermined period of time when communication between the controller and the at least one operator interface device is interrupted or lost.

11. The power system of claim 10, wherein the controller is further configured to cease accelerating the power source speed according to the power boost map when the predetermined period of time expires.

12. The power system of claim 8, wherein the controller is further configured to cease accelerating the power source speed according to the power boost map when an acceleration of a machine powered by the power system falls below a threshold.

13. The power system of claim 12, wherein the controller is further configured to cease accelerating the power source speed according to the power boost map when an acceleration of a traction device driven by the power system falls below a threshold.

14. The power system of claim 8, wherein the controller is further configured to cease accelerating the power source speed according to the power boost map upon receiving an operator request to terminate the propulsion direction change.

15. A machine, comprising:
   at least one traction device;
   a power source operably coupled to a transmission to power the at least one traction device;
   at least one operator interface device, each operator interface device being configured to generate an operator request; and
   a controller configured to, in response to an operator request for a propulsion direction change:
   select a power boost map, which increases a power rating of a power source of the power system
   cause the transmission to direct power into the power source; and
   regulate the power system and accelerate a power source speed according to the power boost map when power is no longer being directed into the power source.

16. The machine of claim 15, wherein the controller is further configured to continue the acceleration of the power source speed when communication between the controller and the at least one operator interface device is interrupted or lost.

17. The machine of claim 16, wherein the controller is further configured to continue accelerating the power source speed for a predetermined period of time when communication between the controller and the at least one operator interface device is interrupted or lost.

18. The machine of claim 17, wherein the controller is further configured to cease accelerating the power source speed according to the power boost map when the predetermined period of time expires.

19. The machine of claim 15, wherein the controller is further configured to cease accelerating the power source speed according to the power boost map when an acceleration of the machine falls below a threshold.

20. The machine of claim 15, wherein the controller is further configured to cease accelerating the power source speed according to the power boost map upon receiving an operator request to terminate the propulsion direction change.

* * * * *